United States Patent
Lima et al.

(10) Patent No.: US 12,301,408 B2
(45) Date of Patent: May 13, 2025

(54) NETWORK TOPOLOGY ORIENTED BYZANTINE FAULT TOLERANT SYSTEM

(71) Applicant: Dell Products L.P., Round Rock, TX (US)

(72) Inventors: Joubert de Castro Lima, Cataguases (BR); Victor da Cruz Ferreira, Rio de Janeiro (BR); Vinicius Facco Rodrigues, São Paulo (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/483,458

(22) Filed: Oct. 9, 2023

(65) Prior Publication Data

US 2025/0119341 A1    Apr. 10, 2025

(51) Int. Cl.
*G06F 15/16*     (2006.01)
*H04L 41/0677*   (2022.01)
*H04L 41/122*    (2022.01)

(52) U.S. Cl.
CPC ........ *H04L 41/0677* (2013.01); *H04L 41/122* (2022.05)

(58) Field of Classification Search
CPC .................. H04L 41/0677; H04L 41/122
See application file for complete search history.

(56) References Cited

U.S. PATENT DOCUMENTS

| | | | | |
|---|---|---|---|---|
| 8,948,053 | B2* | 2/2015 | Kolavennu | H04L 45/02 |
| | | | | 370/255 |
| 9,148,173 | B2* | 9/2015 | Yao | H04L 1/0041 |
| 10,530,574 | B2* | 1/2020 | Shi | H04L 9/0819 |
| 10,701,148 | B2* | 6/2020 | Varney | H04L 41/0803 |
| 2012/0271795 | A1* | 10/2012 | Rao | G06F 16/27 |
| | | | | 707/613 |
| 2016/0315757 | A1* | 10/2016 | Malekpour | G06F 11/1675 |
| 2017/0111234 | A1* | 4/2017 | Kadav | H04L 41/16 |
| 2019/0332518 | A1* | 10/2019 | Lukman | G06F 11/3692 |
| 2021/0018953 | A1* | 1/2021 | Ford | G06F 1/10 |
| 2023/0139892 | A1* | 5/2023 | Chung | H04L 67/10 |
| | | | | 709/226 |
| 2024/0012874 | A1* | 1/2024 | Oyama | G06F 17/16 |

OTHER PUBLICATIONS

Castro, Miguel, and Barbara Liskov. "Practical byzantine fault tolerance." OsDI. vol. 99. No. 1999.
Hao, Xu, et al. "Dynamic practical byzantine fault tolerance." 2018 IEEE conference on communications and network security (CNS).

(Continued)

*Primary Examiner* — Oleg Survillo
(74) *Attorney, Agent, or Firm* — Workman Nydegger

(57) ABSTRACT

Reducing network communication overhead in computing systems. In a computing system that uses messages to achieve consensus, a communication protocol is adapted to include row-wise and column-wise broadcast phases. This reduces communication complexity significantly compared to all-to-all communication protocols. In the event of faulty nodes, a post phase is introduced that allows additional communications in order to achieve consensus. Even when the post phase is required, the communication complexity is reduced compared to all-to-all based communication protocols.

20 Claims, 9 Drawing Sheets

(56) References Cited

OTHER PUBLICATIONS

Jiang, Yanjun, and Zhuang Lian. "High performance and scalable byzantine fault tolerance." 2019 IEEE 3rd information technology, networking, electronic and automation control conference.
Gueta, Guy Golan, et al. "Sbft: a scalable and decentralized trust infrastructure." 2019 49th Annual IEEE/IFIP international conference on dependable systems and networks (DSN).
Arun, Balaji, and Binoy Ravindran. "DuoBFT: Resilience vs. Efficiency Trade-off in Byzantine Fault Tolerance." arXiv preprint arXiv:2010.01387 (2020).
Kotla, Ramakrishna, et al. "Zyzzyva: speculative byzantine fault tolerance." Proceedings of twenty-first ACM SIGOPS symposium on Operating systems principles. 2007.
Miller, Andrew, et al. "The honey badger of BFT protocols." Proceedings of the 2016 ACM SIGSAC conference on computer and communications security.
Duan, Sisi, Michael K. Reiter, and Haibin Zhang. "BEAT: Asynchronous BFT made practical." Proceedings of the 2018 ACM SIGSAC Conference on Computer and Communications Security.
Guo, Bingyong, et al. "Dumbo: Faster asynchronous BFT protocols." Proceedings of the 2020 ACM SIGSAC Conference on Computer and Communications Security. 2020.
Nakamoto, Satoshi. "Bitcoin: A peer-to-peer electronic cash system." Decentralized business review (2008).
King, Sunny, and Scott Nadal. "Ppcoin: Peer-to-peer cryptocurrency with proof-of-stake." self-published paper, Aug. 19.1 (2012).
Pease, Marshall, Robert Shostak, and Leslie Lamport. "Reaching agreement in the presence of faults." Journal of the ACM (JACM) 27.2 (1980): 228-234.

\* cited by examiner

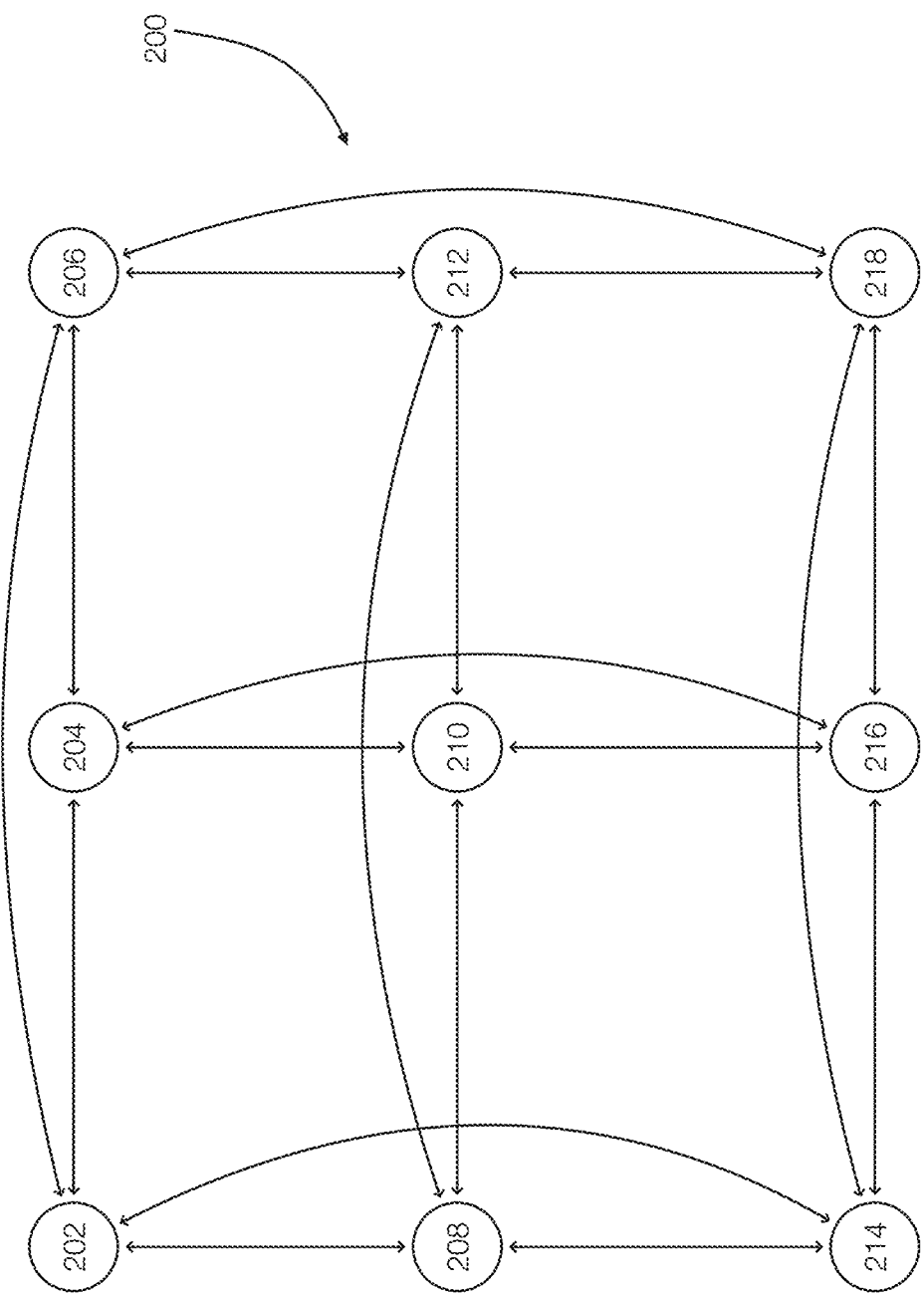

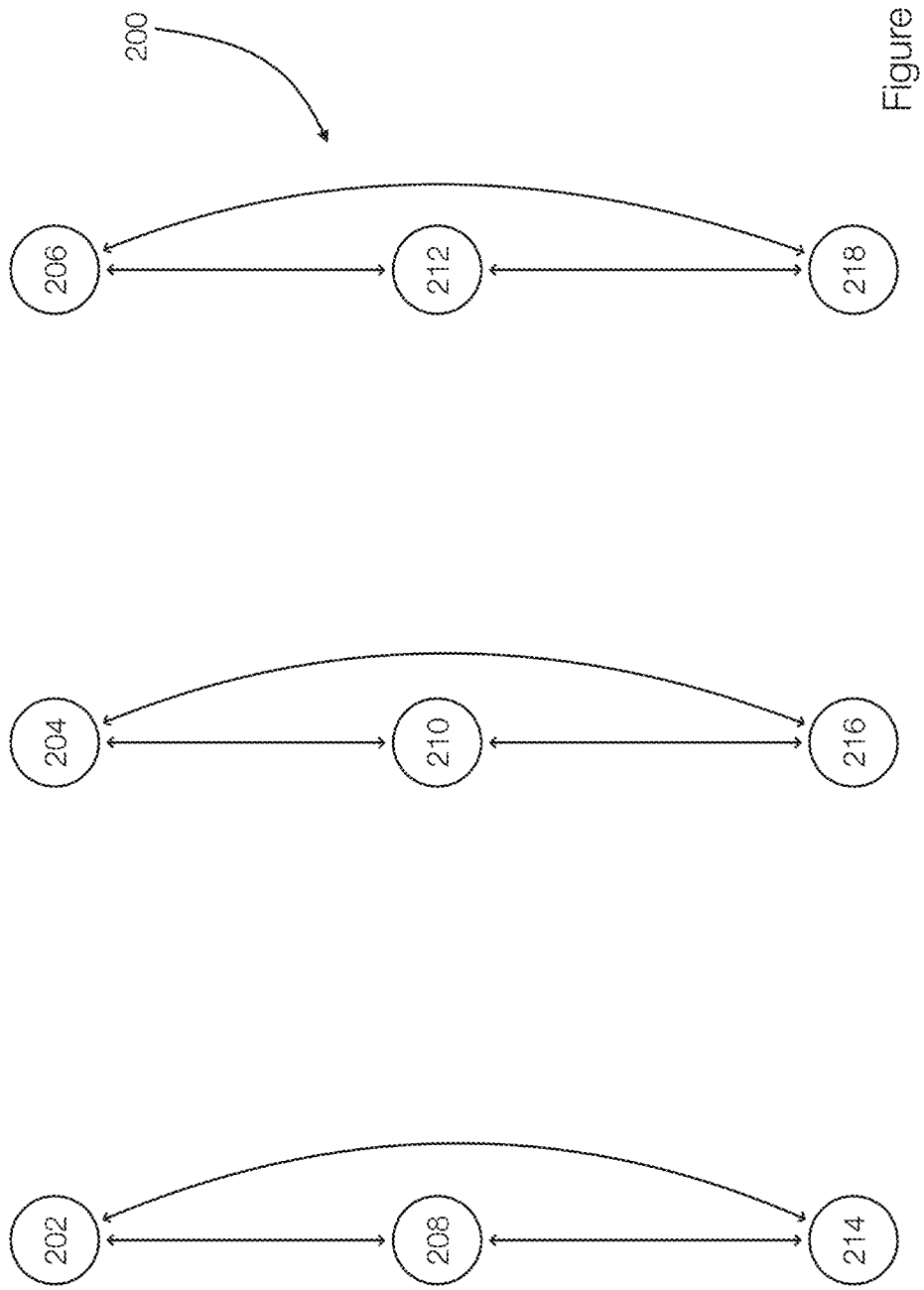

NETWORK TOPOLOGY ORIENTED BYZANTINE FAULT TOLERANT SYSTEM

FIELD OF THE INVENTION

Embodiments of the present invention generally relate to fault tolerance in computing networks. More particularly, at least some embodiments of the invention relate to systems, hardware, software, computer-readable media, and methods for implementing network topologies and protocols that are fault tolerant and that reduce network communication overhead.

BACKGROUND

There is a growing need for technological infrastructure (e.g., computing systems) as well as a need to increase the capabilities or resources thereof. This is often achieved by adding nodes to an existing computing system and/or creating a distributed system. Growing or scaling a computing system, however, may increase security risks. For example, distributed computing systems may be subject to Byzantine faults. A Byzantine fault (or faulty node) can occur in a computing system when one of the nodes fails or when one of the nodes is compromised or for other reasons.

Byzantine fault tolerance reflects the tolerance of a system to Byzantine faults or, more generally, to faulty nodes. Many entities, in addition to expanding their infrastructure, desire to provide more secure and safe computing environments and ensure that their systems are tolerant to faulty nodes including those compromised by Byzantine attacks.

Byzantine Fault Tolerant (BFT) protocols play a role in maintaining system coherence and reliability when the system is subject to Byzantine attacks. More specifically, various BFT protocols exist and are often built on practical BFT (pBFT) protocol. BFT protocols may allow a system or network to reach consensus and consistent agreement even if the system experiences failure or when subject to a Byzantine attack or other fault. Stated differently, BFT protocols allow networks to operate and reach consensus notwithstanding the presence of faulty nodes. These protocols may operate and allow up to one-third of the nodes to be faulty.

Different BFT protocols may be used when generating or determining consensus in distributed computing systems. Unfortunately, BFT protocols may have poor performance. More specifically, BFT protocols often require multiple all-to-all message broadcast phases. This creates a communication complexity of $O(n^2)$, wherein n is the number of nodes in the computing system.

For example, pBFT introduces a three-phase protocol to achieve consensus among distributed nodes. However, this protocol has an $O(n^2)$ communication complexity because it relies on an all-to-all broadcast in multiple phases of the protocol. In an all-to-all broadcast phase, each node may broadcast a message to each of the other nodes in the computing system.

Other pBFT-based protocols have been proposed. These protocols focus on different system characteristics. However, these protocols have the same or similar problems in that their communication complexity generates substantial communication overhead.

Some existing pBFT-based protocols (e.g., High Performance BFT and Scalable pBFT) are designed to reduce the $O(n^2)$ complexity. However, these pBFT-based protocols introduce central points of failure because the consensus of the predicates are validated by a unique system node. Other protocols, like Dynamic Random BFT, DuoBFT, and Zyzzyva protocols, opt to speculate and assume cases without faulty nodes. The communication complexity can be reduced in such cases, but when failures occur, the communication complexity becomes $O(n^2)$ again.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2A discloses aspects of a communication protocol that reduces communication complexity using row and column-wise communication phases;

FIG. 2C discloses aspects of a column-wise or column-based communication phase;

DETAILED DESCRIPTION OF SOME EXAMPLE EMBODIMENTS

Embodiments of the present invention generally relate to fault/failure tolerant computing systems. More particularly, at least some embodiments of the invention relate to systems, hardware, software, computer-readable media, and methods for managing communication overhead in fault tolerant computing systems.

Practical BFT or pBFT is a protocol that allows a computing system (e.g., a collection of servers or nodes) to reach consensus or agreement with respect to a value even when some of the nodes fail, respond with incorrect information, or are compromised (generally referred to as faulty nodes). Nodes that are impacted by a Byzantine attack are also examples of faulty nodes. The pBFT protocol allows decisions to be made in a manner that reduces the influence of faulty nodes. More specifically, pBFT protocols allows decisions to be made in a manner that tolerates a certain number of faulty nodes.

Practical BFT (pBFT) is a protocol used to achieve the goal of allowing a computing system to reach consensus. This protocol includes various phases that are performed prior to reaching consensus. In one example, consensus checking is performed in three phases (pre-prepare, prepare, and commit). Any deviation of any node is informed by healthy nodes during these phases to avoid incorrect consensus. For example, a client may start the protocol by requesting a validation or some operation that requires consensus. A primary node is responsible for receiving the client request and starting three phases called pre-prepare phase, prepare phase, and commit phase.

The primary node accepts the pre-prepare message or request from the client. In the pre-prepare phase, the primary node generates a new view and submits transactions associated with the view in a message via broadcast to the other non-primary nodes in the view. Once a non-primary node accepts the pre-prepare message, the non-primary node enters the prepare phase. In the prepare phase, a node broadcasts a signed prepare message to all the nodes in the view. If a node receives 2f (f is the number of faulty nodes) different prepare messages that match its accepted pre-prepare message, the node can begin a commit phase. In the commit phase, if a node receives 2f+1 different commit messages matching its pre-prepare and prepare messages, the node commits the transactions and replies to the client. The transactions are considered to be correct (e.g., consensus) when the client receives f+1 identical results or responses from different nodes in the same view defined by the primary node.

This protocol includes multiple phases that each require all-to-all broadcasts. This infers a communication complexity of $O(n^2)$ for each phase that requires an all-to-all broadcast.

Figure 1:
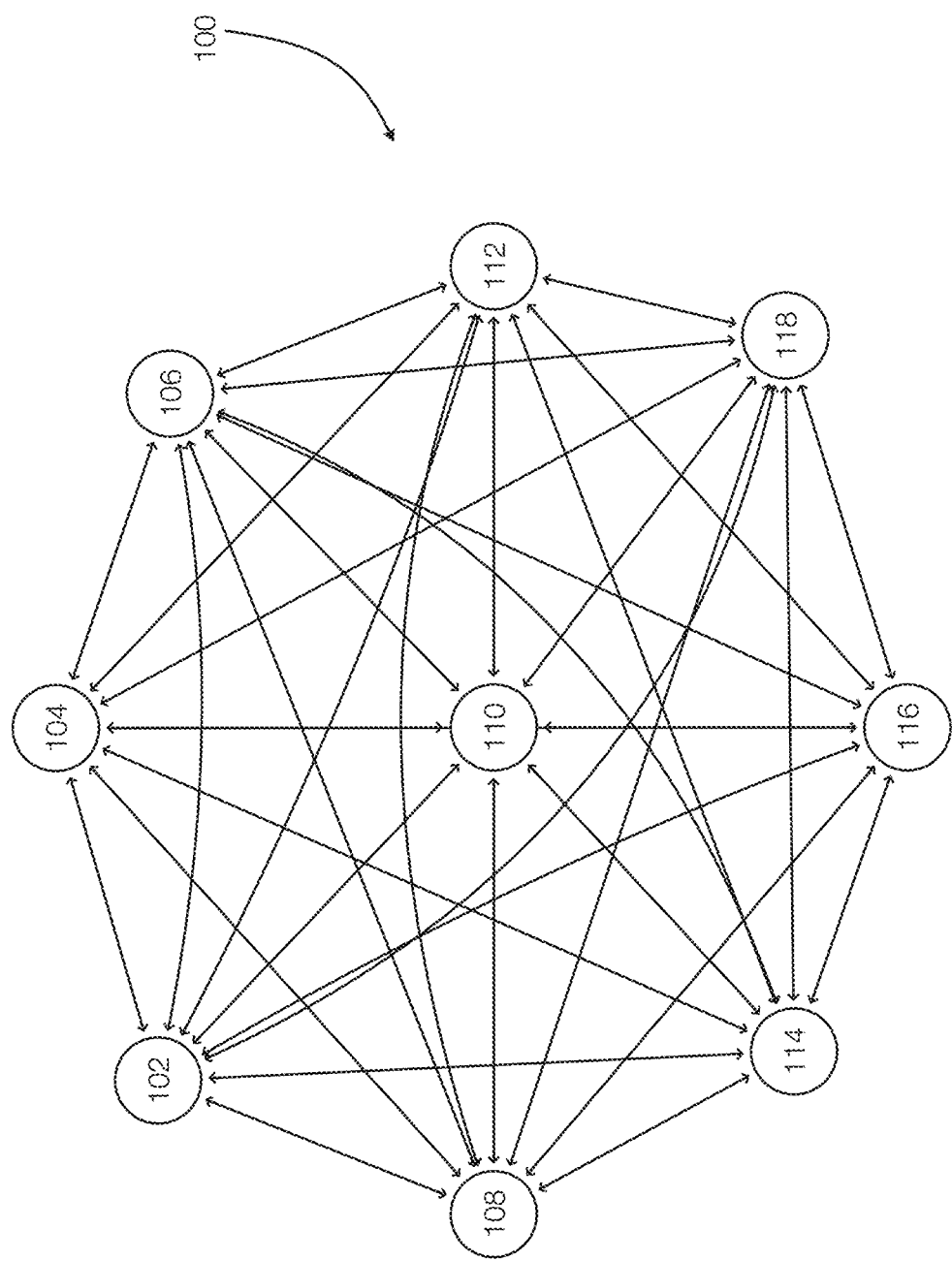
FIG. 1 discloses aspects of all-to-all based communication protocols in a distributed computing network that includes multiple nodes.

FIG. 1 generally illustrates a communication complexity of a conventional pBFT protocol. FIG. 1 illustrates a computing network 100 with nodes 102, 104, 106, 108, 110, 112, 114, 116, and 118. During some of the phases of the BFT protocol, as illustrated by the arrows, multiple all-to-all communications or messages are performed. This results in a communication complexity of $O(n^2)$ for each phase.

Embodiments of the invention relate to reducing the communication complexity of a computing system that may employ protocols such as BFT protocols. In one example, this is achieved by changing the topology of the network. In one example, the topology is changed to be or represent a 2D matrix whose dimensions are r×c, where $r=c=\sqrt{n}$, where n is the number of nodes. If necessary, virtual nodes may be added to the topology to achieve the network matrix topology. Embodiments of the invention, however, are not limited to this particular topology, but may be used with other network topologies including topologies having rows and columns that are not equal in number.

Rather than perform multiple all-to-all broadcast phases, embodiments of the invention implement row-wise and column-wise broadcast phases (also referred to as row-based and column-based broadcast phases). These row and column-based broadcast phases combine to have a communication complexity of $O(n^{1.5})$ in terms of messages in one example. In one example, an extra phase or a post phase may be needed when one or more nodes are faulty and consensus cannot be achieved. Embodiments of the invention are generic and may be implemented into at least pBFT protocols and/or other BFT-based protocols that may include all-to-all broadcast phases. In one example, embodiments of the invention include broadcast phases that can replace various all-to-all broadcast phases in existing pBFT based protocols.

The square 2D matrix network topology can be visualized as a square matrix where each node $N_{ij}$ is fully connected with the other nodes in its row i and column j. For other nodes not directly connected to $N_{ij}$, the mesh organization or topology of the computing system relies on neighbors to relay messages.

The row-based broadcast phase is a phase where each node in each row sends and receives messages to/from nodes in the same row. In a system with 16 nodes, for example, the topology may be viewed as a 4×4 matrix. Each row node has three other nodes with which to exchange messages. The nodes of the network can perform their broadcasts asynchronously and in parallel. Thus, with respect to the first row of the example 4×4 matrix, each of the four nodes has a vector or other structure storing the messages from the other nodes in the same row. More specifically, each node stores, in effect, four messages: its own message and the messages from the other 3 nodes in the row. The other nodes in the other rows have similar vectors.

The column-based broadcast may proceed, in one example, after a node has received all messages from the other nodes in the row. Each column node propagates its own messages to its column's neighbors. Every node has the responsibility to propagate the messages received from its row neighbors during the row-based phase. After the column-based communication phase, all nodes in the network have all of the messages of all nodes in the network (assuming there are no faulty nodes).

Because the square 2D matrix topology relies on column-based broadcasts to relay messages among nodes, targeted attacks may limit the ability of a few nodes to achieve consensus. Although modifying messages is very difficult due to cryptographic security, faulty nodes may withhold messages to trigger a timeout. Therefore, in case a node is unable to reach consensus, the node may call a post phase for itself.

In the post phase, a node can request column-based messages from every other node it did not communicate with in the row and column-based phases. The post phase works as a limited fail-safe that lets the node receives messages from nodes in other rows and columns. The post phase adds a $O(k(n-2\sqrt{n}))$ into the communication complexity, where k is the number of nodes requesting the post phase. However, k is expected to be small and a communication complexity of or about $O(n-2\sqrt{n})$ should be maintained.

In one example, all-to-all broadcast phases from the pBFT-based protocols can be changed to or replaced with row and column-based broadcast phases using a square 2D matrix-based network topology. The row-based and column-based broadcasts reduce the communication complexity from $O(n^2)$ to $O(n^{1.5})$ in many cases.

In some examples, nodes are logically organized in a square 2D matrix-based mesh network topology and only communicate with the nodes in the same row and column during some of the protocol phases. This is distinct from traditional approaches at least in that the requirement of having each node communicate with every other node in the system is removed, which advantageously reduces the communication complexity.

FIG. 2A discloses aspects of communication complexity in a matrix-based network. FIG. 2A, by way of example, illustrates the network 100 that has been initially transformed or into a network 200 that has a square 2D topology. The nodes are thus renumbered as nodes 202, 204, 206, 208, 210, 212, 214, 216, and 218. As illustrated in FIG. 2A, the network 200 is arranged in a square 2D topology, at least for communication purposes, as the nodes are not necessarily physically rearranged into a 2D matrix. If there are insufficient nodes to form a 2D matrix, virtual nodes may be added to complete the square 2D matrix arrangement in one example. The virtual nodes may participate in the communication phases to ensure that messages are distributed to all nodes.

Virtual nodes are used (e.g., added) to transform non-square network topologies into square or squared network topologies. This reduces the number of communications when compared with a non-square 2D matrix-based topology. Compared to the network 100, the communication complexity in the network 200 is reduced, compared to the network 100, at least because the requirement of all-to-all communication is removed. Embodiments of the invention implement row and column-based communications to exchange messages among the nodes in the network in order to reach consensus. As a result, each node is no longer required to communication with every other node.

More specifically, the embodiments of the invention relate to a protocol that includes two phases that may occur sequentially. First, a row-wise broadcast is performed in which nodes exchange messages between or with their row neighbors. This ensures that each node in a row has all of the messages for all nodes of the same row. Second, a column-wise broadcast is performed in which nodes from the same column exchange messages, including those received in the row-based phase. This protocol modification introduces the message relay concept in the column-wise phase, allowing messages to be exchanged between nodes that do not directly communicate with each other.

Figure 2B:
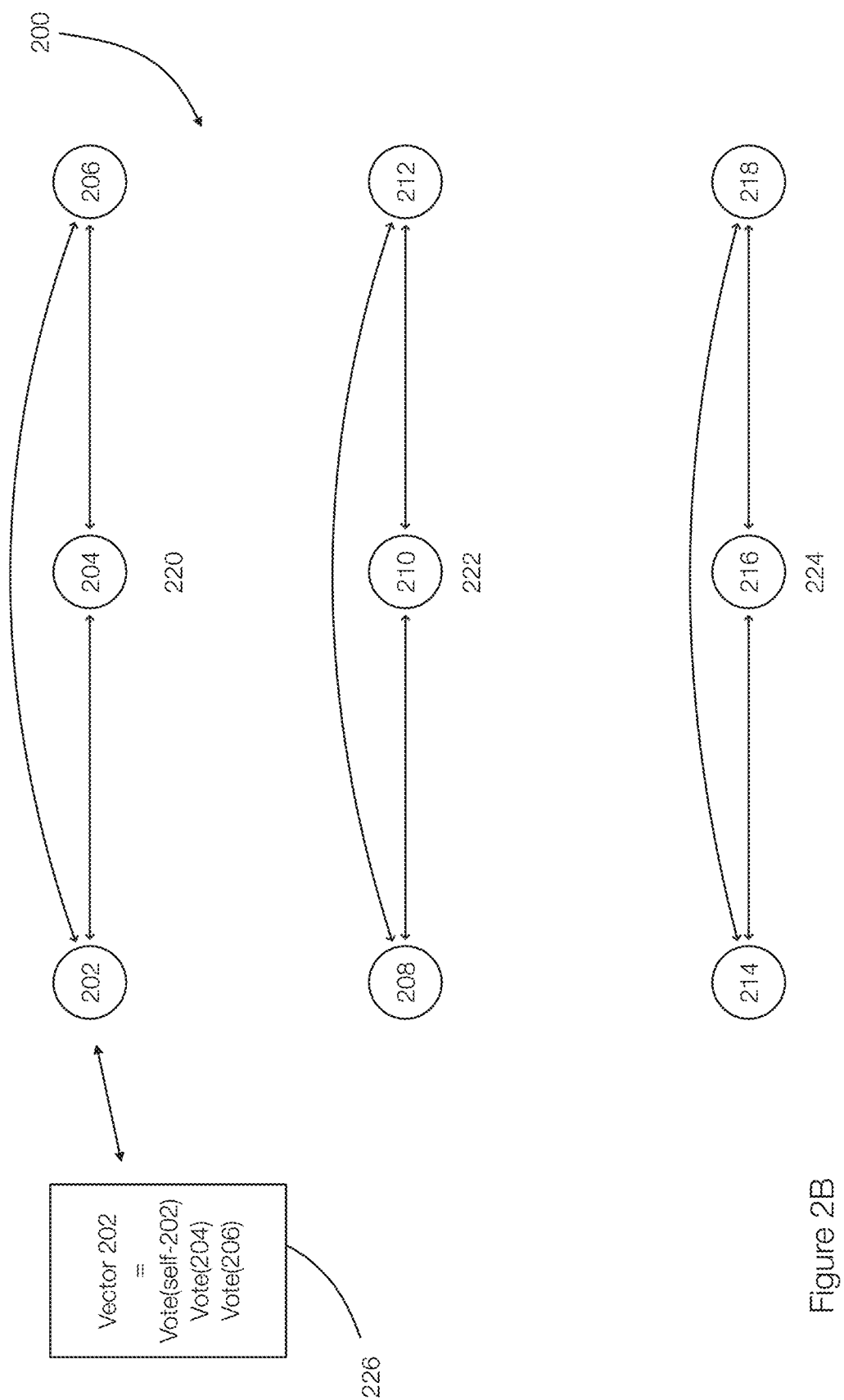
FIG. 2B discloses aspects of a row-wise or row-based communication phase.

FIG. 2B discloses aspects of row-based communications. In the computing system 200, the nodes 202, 204, and 206 in the row 220 communicate with each other or via their node neighbors. The nodes in the rows 222 and 224 communicate in a similar manner. After the row-wise or row-based communication is performed, each node may contain or be associated with a message vector, such as the message vector 226. The vector 226 for the node 202 includes a vote or message for other nodes in the same row. If there are r rows and c columns, the vectors for the nodes in the row 220 are vectors $V_{11}, V_{12}, \ldots V_{1c}$ and the vectors for the nodes in the row 224 are represented $V_{r1}, V_{r2}, \ldots V_{rc}$. Stated generally, each node $N_{ij}$ holds a vote vector $V_{ij}$ containing all message votes from its row i neighbors.

Once any node receives all messages during the row-based communications, the next phase (column-based communication) is performed by at least this node. In other words, the phases for the various nodes in the network may be asynchronously performed.

FIG. 2C discloses aspects of column wise or column based communication. After the row based communication shown in FIG. 2B is performed, column based communication is performed in the network 200. In a column-wise broadcast, each node communicates with their direct column neighbors. Further, each node is responsible for forwarding all messages received in the previous row-based communication phase. At the end of this phase, each node $N_{ij}$ holds a new or updated voting vector V that includes the previous vector $V_{ij}$ plus all vectors from all column neighbors. Thus, if there are no faulty nodes, each node has messages from all of the other nodes after the row-based and column-based communication phases.

In one example, all nodes should perform both row and column based communications. After performing the row and column based communications, each node should include a voting vector that includes votes or messages from all of the nodes. This is achieved without requiring all-to-all communications. Further, compression can be applied to merge messages and decrease content size as long as security measures are maintained. Thus, every node will receive the messages needed to achieve consensus.

In one example, and because the network topology is represented as a square matrix, the number of nodes is represented as: $n=r \times c=\sqrt{n} \times \sqrt{n}$. During the row-based broadcast every node will send r−1 messages (one for each direct row neighbor). During the column-wise phase every node will send c−1 messages.

Considering a single node, its total messaging at the end of both phases is $r+c-2=\sqrt{n}+\sqrt{n}-2 \cong O(2\sqrt{n})$. If all n nodes from the system send the same number of messages, the communication complexity may be represented as: $O(n*2\sqrt{n}) \cong O(n^{1.5})$, which is smaller than a communication complexity of $O(n^2)$. This demonstrates that, using row and column based phases in a 2D square mesh topology, the communication complexity is reduced compared to an all-to-all communication scenarios.

Figure 3:
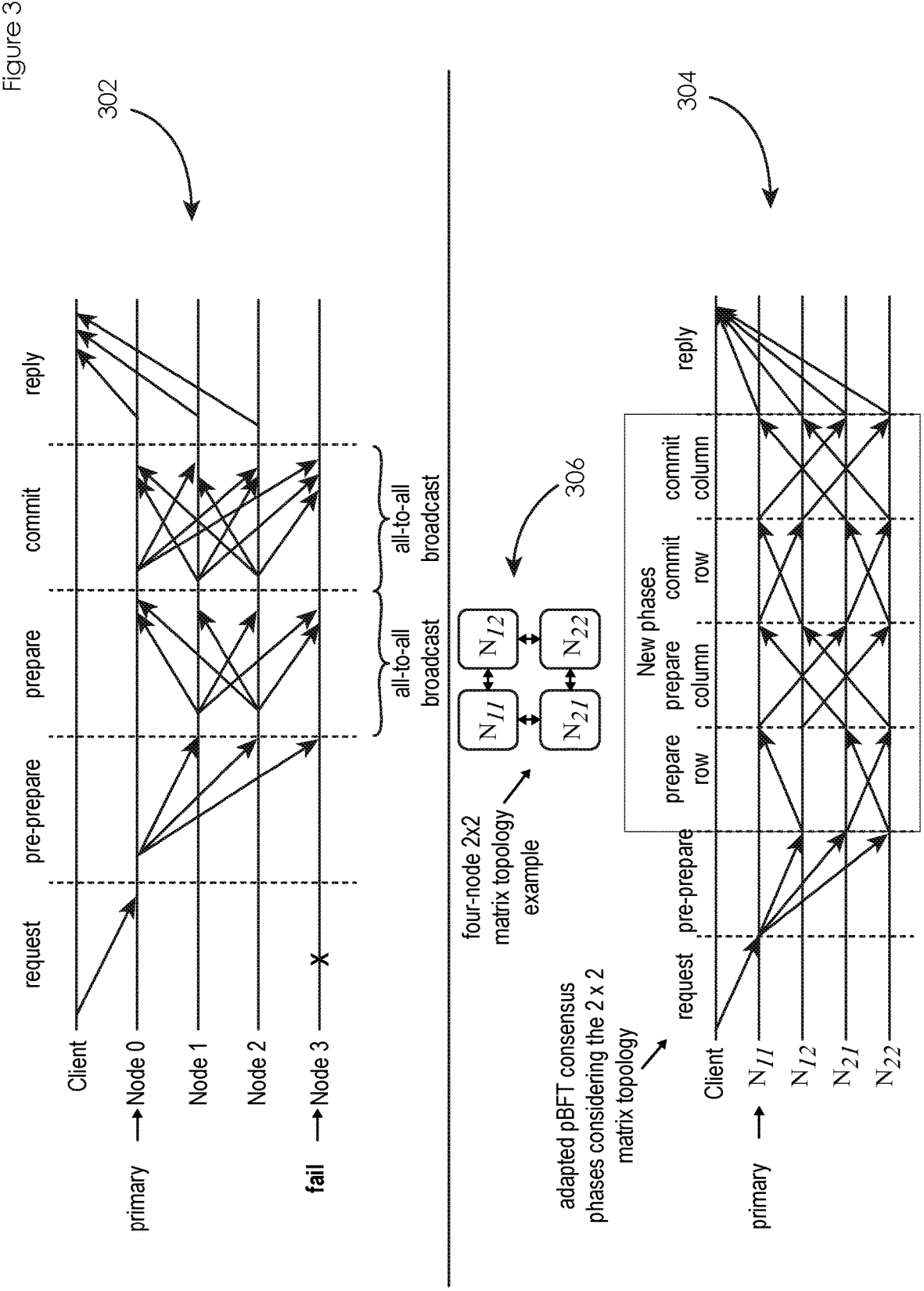
FIG. 3 discloses aspects of reducing communication complexity using row and column based communication phases compared to all-to-all based communication phases.

FIG. 3 discloses aspects of row and column-based communications. FIG. 3 illustrates an example of pBFT communications 302 based on an all-to-all communication protocol. FIG. 3 also illustrates an example of pBFT communications 304 in accordance with embodiments of the invention. The prepare and commit phases in the communications 302 are replaced in the communications 304 with new phases including a prepare row phase, a prepare column phase, a commit row phase, and a commit column phase.

The communications 304 or protocol shown in FIG. 3 is based on an example network of nodes 306 of four nodes or n=4 that has a square topology. A client that starts the interaction. The mesh network or nodes 306 are illustrated in a 2D or 2×2 matrix in FIG. 3. The communications 304 are also represented in a normal case without any faulty nodes (the communications 302 are illustrated in the presence of a faulty node). In the prepare row phase in the nodes 306, only the node $N_{12}$ sends a message to the primary node $N_{11}$ because the primary node ($N_{11}$) sent broadcast messages previously in the pre-prepare phase. The pre-prepare phase in the communications 304 is the same as the pre-prepare phase in the communications 302. The nodes $N_{21}$ and $N_{22}$ exchange messages in the prepare row phase in the communications 304.

In the prepare column phase, the final set of messages is received by each node in the system or network of nodes 306. Thus:

$N_{11}$ sends to $N_{21}$ its message together with the $N_{12}$ message received in the prepare row phase.

$N_{12}$ sends to $N_{22}$ its message together with the $N_{11}$ message received in the prepare row phase.

$N_{21}$ sends to $N_{11}$ its message together with the $N_{22}$ message received in the prepare row phase.

$N_{22}$ sends to $N_{12}$ its message together with the $N_{21}$ message received in the prepare row phase.

After each node applies the pBFT predicates to check if the transactions submitted by the client are prepared, each node can enter commit row phase. In the commit row phase, the same procedure is followed and includes row-based communications. This is followed by a column-based communications phase. If the commit predicates are satisfied, each node can submit its response to the client to be validated in the reply to the client.

Embodiments of the invention using row and column-based broadcast protocols are resistant to byzantine faults and allow honest or non-faulty nodes to reach consensus. However, an attacker that is aware of the topology may target one or more nodes. The attacker may cause these nodes to withhold their messages and thereby force timeouts. In one example, embodiments of the invention are willing to accept up to f faults, where n≥3f+1.

Figure 4:
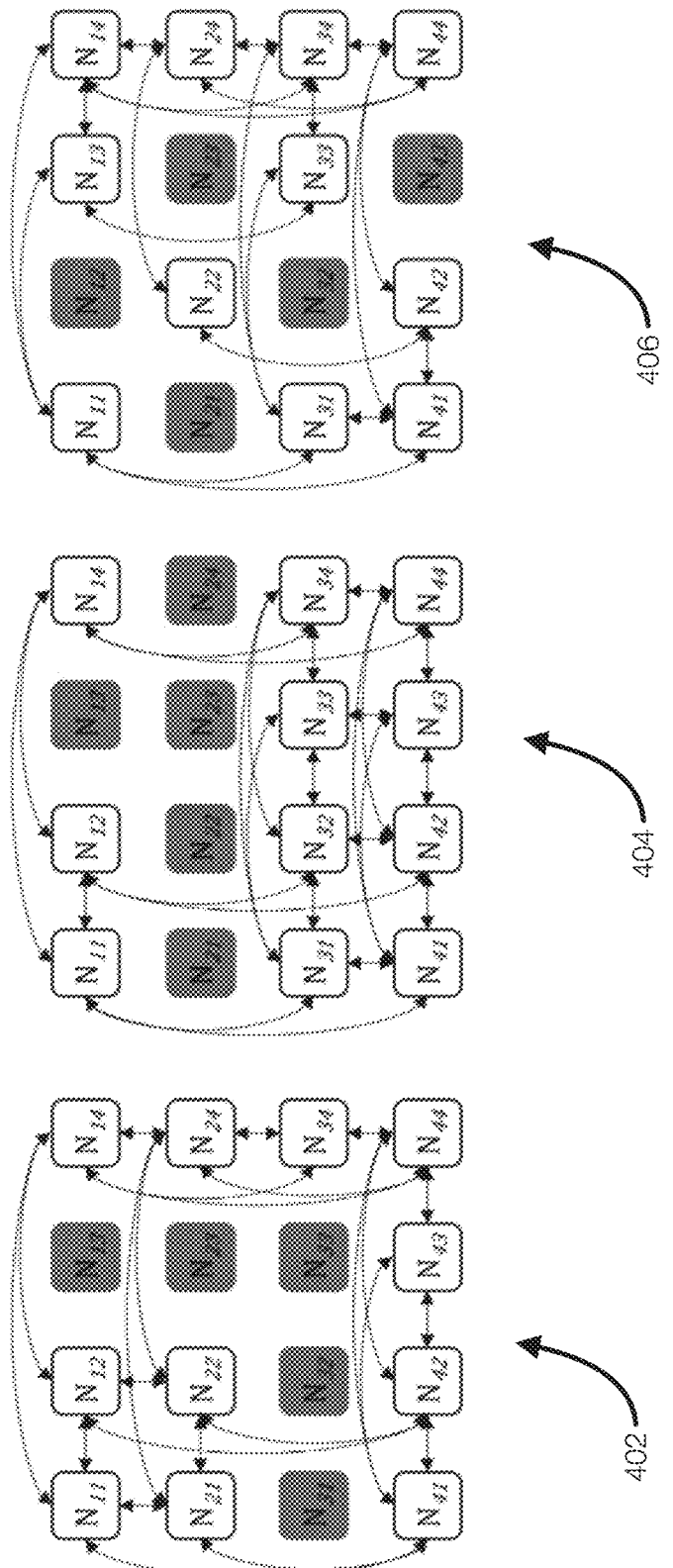
FIG. 4 discloses aspects of a faulty node topology that may trigger a post phase.

FIG. 4 illustrates aspects of target attacks that may prevent honest nodes from reaching consensus. FIG. 4 illustrates a system with 16 nodes and 5 faulty nodes. In this example, every node needs at least 2f=10 messages to reach consensus. FIG. 4 illustrates three examples of topological attacks. The attacked or faulty nodes are shaded in FIG. 4. The topologies 402, 404, and 406 illustrate that an attacker may attack the nodes strategically, randomly, or in another manner.

In this example, the shaded nodes may opt to not repass or forward messages received from other nodes. As a result, some of the non-faulty or honest nodes cannot reach a consensus. For example, in the network or topology 402, the node $N_{43}$ will receive all of the messages during the row-wise broadcast but will receive no messages during its column-wise broadcast phase.

The node $N_{33}$ in the topology 404 will receive all messages during the row-wise broadcast phase, but will not receive all messages during the column-wise broadcast phase. Similarly, the node $N_{22}$ in the topology 406 does not receive all messages in either of the row-wise broadcast phase or the column-wise broadcast phase.

In one example, cryptographic signatures may prevent the content of the messages from being changed. However, the scenarios represented in the topologies 402, 404, and 406 relate to situations where messages are withheld and not forwarded during the row and/or column-based broadcast phases. In the BFT protocol, every honest node should reach a consensus. As a result, preventing a node from broadcasting messages may prevent consensus in the network.

Embodiments of the invention overcome this issue in one example by introducing a post phase. In one example, the post phase may be initiated after a node times out (node timeout) and does not finish the column-wise broadcast phase. The post phase includes some of the nodes (as necessary) sending messages to every node inside the system or included in the network except for its row and column direct neighbors. This allows nodes to bypass faulty direct neighbor nodes and receive the messages from other nodes by communicating with the set of non-direct neighbor nodes. In one example and in contrast to the row and column-based broadcast phases, only nodes that do not reach consensus are required to perform the post phase when timeouts occur.

Thus, during the post phase in one example, each node that has not achieved consensus sends messages to every other node that the node did not communicate with during the row and column based broadcast phases. Thus, if r+c−2 messages were sent during the row and column based phases, n−(r+c−2) messages are expected during the post phase for a node.

As previously stated, the communication complexity of a single node during the row and column-wise phases is $O(2\sqrt{n})$. Therefore, a communication complexity of $O(n-2\sqrt{n})$ can be inferred for each node calling the post phase.

In one example, target attacks are likely to be limited and the topology can be reformulated at any point to avoid faulty or malicious nodes. As a result, the number of nodes k expected to call for a post phase should be small (k<<n). Advantageously, a communication complexity of or about $O(n-2\sqrt{n})$ should be maintained.

Furthermore, in the unlikely case of k=n, the row and column wise broadcast phases together with the post phase would amount for $n^{1.5}+n(n-2\sqrt{n})=n^2-n^{1.5}$ total messages, which is still lower in absolute terms than the complexity of original all-to-all broadcast messages of $n^2$.

Figure 5:
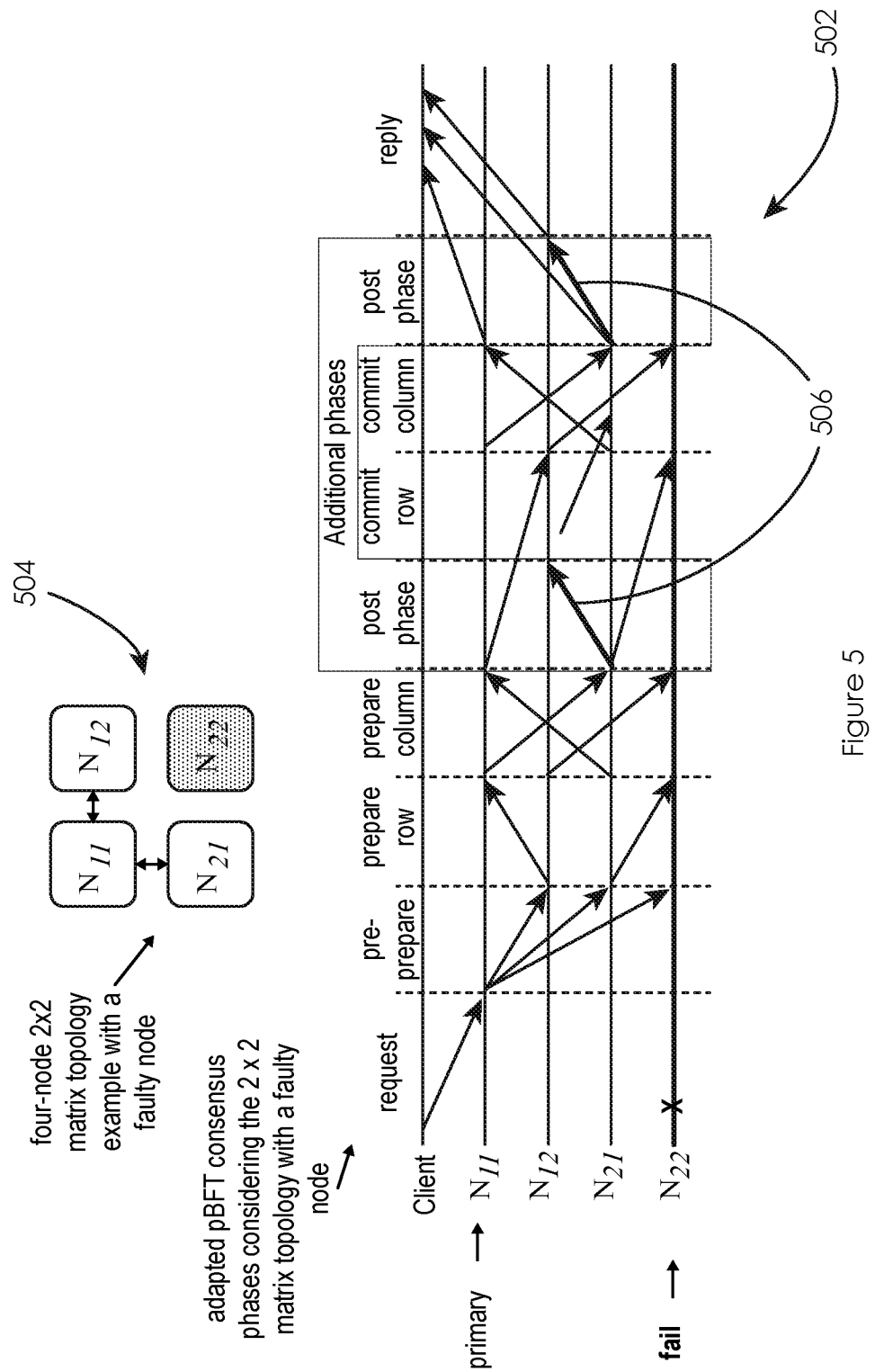
FIG. 5 discloses aspects of the post phase in a mesh or distributed network that includes faulty nodes.

FIG. 5 discloses aspects of communication complexity in a network with a faulty node. FIG. 5 illustrates communications 502 for a network 504 of nodes. In this example, the node $N_{22}$ is faulty (e.g., attacked, compromised, not functioning). Because the node $N_{22}$ is faulty, the node $N_{22}$ causes ambiguity in the node $N_{12}$ because the node $N_{22}$ can retain the $N_{21}$ row-based message in the column-based phase. In summary, the node $N_{22}$ can avoid sending its own message and the message of the node $N_{21}$ to the node $N_{12}$.

More specifically, the node $N_{12}$ detects that the $N_{22}$ retains message content because every node has a timeout for each phase in any synchronous or weak-synchronous BFT protocol and all messages are signed. Therefore, the $N_{12}$ starts the post phase to request column-based messages from the node $N_{21}$. After the node $N_{12}$ receives the column-based message from the node $N_{21}$, the node $N_{21}$ can reach consensus and reply to the client. In this example, the client requires only f+1 identical responses. Because f=1 in this example and the node $N_{12}$ receives 2 messages that are identical from the nodes $N_{11}$ and $N_{21}$ after the post phase, consensus can be achieved. In this example, the post phase messages are illustrated as messages 506 and only the node $N_{12}$ entered the post phase.

According to this example, the client needs two identical responses. After the post phase, the responses from the nodes $N_{11}$ and $N_{21}$ are enough since they do not require the post phase and can submit their replies earlier than the node $N_{12}$. In this example, the fact that the node $N_{12}$ requires the post phase does not impose any additional delay to the client.

Advantageously in one example, the number of bits exchanged in the network, in some examples, is never higher than the number of bits transmitted by the existing BFT protocols because message contents in column-wise broadcasts are concatenated. Compression strategies can reduce the number of bits transmitted using the square 2D matrix-based mesh network topology.

The post phase is defined or performed, in one example, for or by nodes that do not reach consensus. This allows those nodes to request additional column-wise messages. Advantageously, communication overhead is reduced at least because all of the nodes are not required to perform the post phase. Further, embodiments of the invention do not cause a central point of failure, in contrast to other pBFT protocols that may reduce communication complexity.

Figure 6:
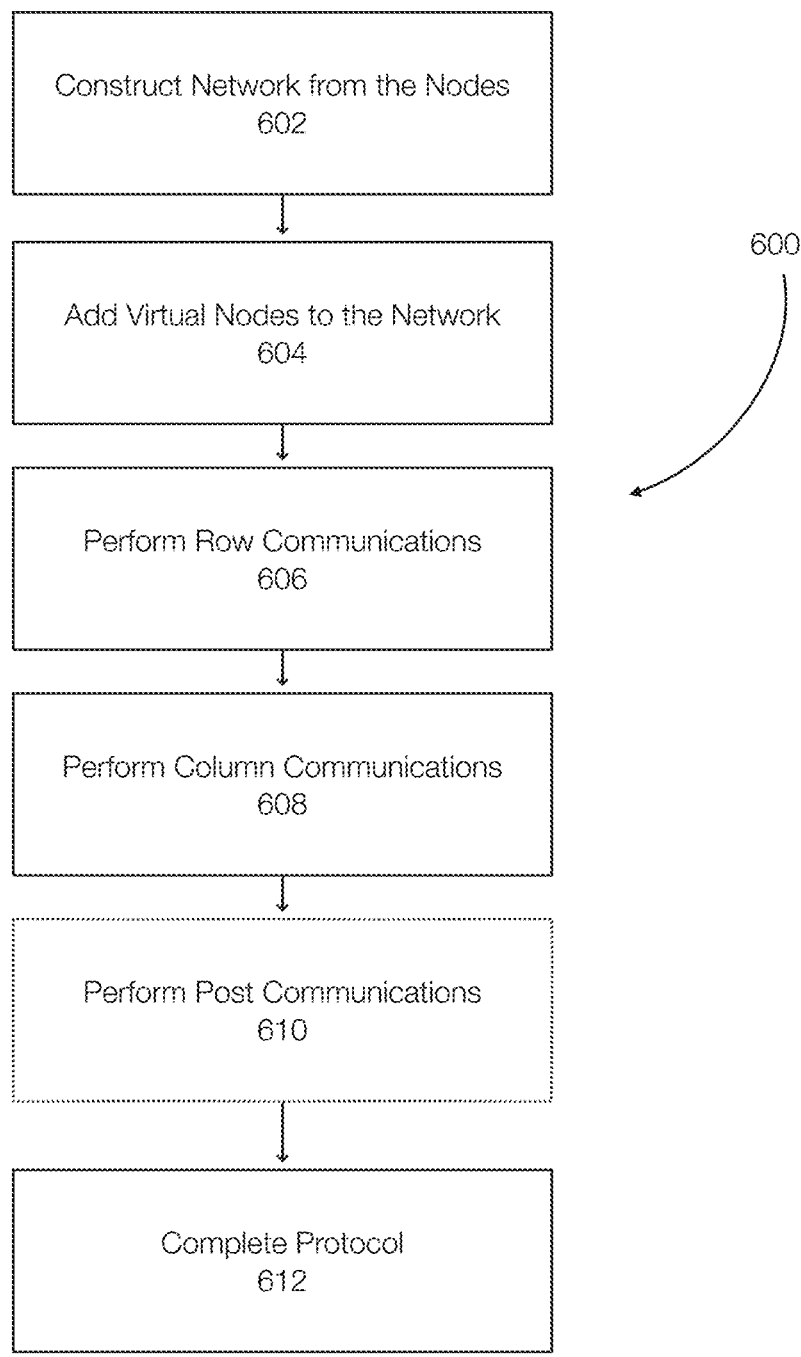
FIG. 6 discloses aspects of a method for achieving consensus in a mesh or distributed network with multiple nodes.

FIG. 6 discloses aspects of achieving consensus in a network. The method 600 includes elements that may be performed independently of other elements. For example, the method 600 may construct 602 a network. This may include rearranging (logically) the nodes of an existing network into a square 2D matrix at least for communication purposes.

If the number of nodes is not suitable for a square 2D matrix topology, virtual nodes may be added 604 as necessary. For example, a system with 23 nodes may add 2 virtual nodes to form a 5×5 matrix topology. These virtual nodes may operate to send messages to other nodes in the row and column-based communication phases.

Next, a consensus operation may be triggered by a client. The protocol may include performing 606 row-based communications. The row-based communications are followed by performing 608 column-based communications. If necessary, post phase communications are performed 610. More specifically, post phase communications may not be necessary as the protocol can tolerate some faulty nodes. The protocol is then completed 612 and consensus is achieved or not achieved and a reply may be provided to the client.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations which may include, but are not limited to, operations to reduce network communication overhead of protocols including pBFT-based protocols, row-wise or row-based communication operations, column-wise or column-based communication operations, post phase operations, or the like. More generally, the scope of the invention embraces any operating environment in which the disclosed concepts may be useful.

At least some embodiments of the invention provide for the implementation of the disclosed functionality in existing platforms, which may include backup or data protection platforms, examples of which include the Dell-EMC Net-Worker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection or data storage system components such as databases, storage servers, storage volumes (LUNs), storage disks, replication services, backup servers, restore servers, backup clients, and restore clients, for example, may likewise take the form of software, physical machines containers, or virtual machines (VM), though no particular component implementation is required for any embodiment.

Example embodiments of the invention are applicable to any system capable of storing and handling various types of objects or data, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted with respect to the disclosed methods that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: initiating a protocol to achieve consensus in a network that includes nodes, performing row-based communications among the nodes in the network, wherein each node only exchanges messages with nodes in the corresponding topological row during the row-based communications, performing column-based communications among the nodes in the network, wherein nodes in the same columns exchange messages including messages received during the row-based communications, wherein each node only exchanges messages with nodes in the corresponding topological column during the column-based communications, and replying to a client, wherein the is configured to determine whether consensus was achieved in the network.

Embodiment 2. The method of embodiment 1, further comprising constructing the nodes into a topology of a square 2D matrix that includes r rows and c columns, wherein $r=c=\sqrt{n}$, wherein n is a number of the nodes.

Embodiment 3. The method of embodiment 1 and/or 2, further comprising adding virtual nodes to the topology such that the topology is the square 2D matrix.

Embodiment 4. The method of embodiment 1, 2, and/or 3, wherein the row-based communications and/or the column based-communications are performed asynchronously by the nodes.

Embodiment 5. The method of embodiment 1, 2, 3, and/or 4, wherein the row-based communications and the column-based communications, after completion, are configured to provide each of the nodes with messages from each of the other nodes in the network.

Embodiment 6. The method of embodiment 1, 2, 3, 4, and/or 5, further comprising identifying faulty nodes in the network.

Embodiment 7. The method of embodiment 1, 2, 3, 4, 5, and/or 6, further comprising performing a post phase for each identified node that did not achieve consensus.

Embodiment 8. The method of embodiment 1, 2, 3, 4, 5, 6, and/or 7, wherein the post phase includes, for each of the identified nodes, communicating only with nodes that are not in the corresponding row or column.

Embodiment 9. The method of embodiment 1, 2, 3, 4, 5, 6, 7, and/or 8, wherein the nodes are constructed into a topology of a square 2D matrix that includes r rows and c columns, wherein $r=c=\sqrt{n}$, wherein n is a number of the nodes and wherein each of the nodes performs $r-1$ communications in the row-based communications and $c-1$ communications during the column-based communications, wherein each of the identified nodes performs $n-(r+c-2)$ communications during the post phase.

Embodiment 10. The method of embodiment 1, 2, 3, 4, 5, 6, 7, 8, and/or 9, wherein the identified nodes include nodes that do not reach consensus.

Embodiment 11. The method of embodiment 1, 2, 3, 4, 45, 6, 7, 8, 9, and/or 10, wherein the row-based communications are configured to be substituted into protocols that include all-to-all broadcast phases, the all-to-all broadcast phases including prepare phases and commit phases.

Embodiment 12. A method for achieving consensus in a network, the method comprising: receiving a request from a client at a primary node, and performing a protocol in the network that includes: by the primary node, performing a pre-prepare phase by broadcasting a message to other nodes in the network, performing a prepare row phase that includes only row-based communications, performing a prepare column phase that includes only column-based communications, performing a commit row phase, wherein the commit row phase only includes row-based communications, performing a commit column phase, wherein the commit column phase only includes column-based communications, and achieving consensus and sending a reply to the client.

Embodiment 12. The method of embodiment 11, further comprising performing a post phase when faulty nodes are detected or when identified nodes do not achieve consensus.

Embodiment 14. The method of embodiment 12 and/or 13, wherein the post phase does not include row or column based communications, wherein the identified nodes communicate with nodes that are not in the corresponding rows or columns of the identified nodes.

Embodiment 15. A system, comprising hardware and/or software, operable to perform any of the operations, methods, or processes, or any portion of any of these, disclosed herein.

Embodiment 16. A non-transitory storage medium having stored therein instructions that are executable by one or more hardware processors to perform operations comprising the operations of any one or more of embodiments 1-14.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, client, agent, service, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
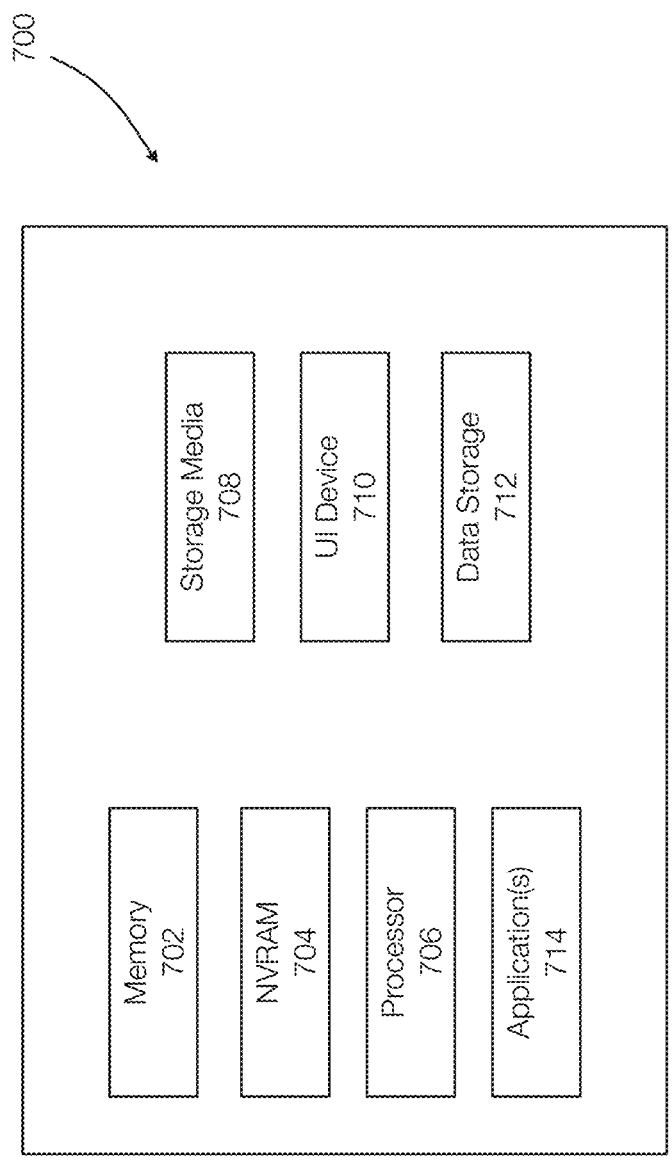
FIG. 7 discloses aspects of a computing device, system, or entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving a request from a client to determine consensus in a network that includes nodes; wherein determining consensus comprises:
performing row-based communications among the nodes in the network, wherein each node only exchanges messages with nodes in the corresponding topological row during the row-based communications; and
performing column-based communications among the nodes in the network, wherein nodes in the same columns exchange messages including messages received during the row-based communications, wherein each node only exchanges messages with nodes in the corresponding topological column during the column-based communications; and
replying to a client based on the row-based communications and the column-based communications.

2. The method of claim 1, further comprising constructing the nodes into a topology of a square 2D matrix that includes r rows and c columns, wherein $r=c=\sqrt{n}$, wherein n is a number of the nodes.

3. The method of claim 2, further comprising adding virtual nodes to the topology such that the topology is the square 2D matrix.

4. The method of claim 1, wherein the row-based communications and/or the column based-communications are performed asynchronously by the nodes.

5. The method of claim 1, wherein the row-based communications and the column-based communications, after completion, are configured to provide each of the nodes with messages from each of the other nodes in the network.

6. The method of claim 1, further comprising identifying faulty nodes in the network by identifying nodes that failed to communicate during the row-based communications and/or the column-based communications.

7. The method of claim 6, further comprising performing a post phase for each identified node that did not achieve consensus.

8. The method of claim 7, wherein the post phase includes, for each of the identified nodes, communicating only with nodes that are not in the corresponding row or column.

9. The method of claim 8, wherein the nodes are constructed into a topology of a square 2D matrix that includes r rows and c columns, wherein $r=c=\sqrt{n}$, wherein n is a number of the nodes and wherein each of the nodes performs $r-1$ communications in the row-based communications and $c-1$ communications during the column-based communications, wherein each of the identified nodes performs $n-(r+c-2)$ communications during the post phase.

10. The method of claim 9, wherein the identified nodes include nodes that do not reach consensus.

11. The method of claim 1, wherein the row-based communications are configured to be substituted into protocols that include all-to-all broadcast phases, the all-to-all broadcast phases including prepare phases and commit phases.

12. A method for achieving consensus in a network, the network including a plurality of nodes arranges is rows and columns, the method comprising:
receiving, at at least one of the nodes in the network, a request from a client; and
in response to receiving the request, performing an operation in the network that includes:
performing a prepare row phase that includes only row-based communications in which nodes that are in the same row as each other exchange messages with each other;
after performing the prepare row phase, performing a prepare column phase that includes only column-based communications in which nodes that are in the same column as each other exchange messages with each other;
after performing the prepare column phase, performing a commit row phase, wherein the commit row phase only includes row-based communications in which nodes that are in the same row as each other exchange messages with each other;

after performing the prepare commit row phase, performing a commit column phase, wherein the commit column phase only includes column-based communications in which nodes that are in the same column as each other exchange messages with each other;

determining whether there is consensus among the plurality of nodes, including determining whether a threshold number of the plurality of nodes communicated during the prepare row phase, the prepare column phase, the commit row phase, and the commit column phase; and sending a reply to the client based on determining whether there is consensus.

13. The method of claim 12, further comprising performing a post phase when an identified node cannot reach consensus, wherein an identified node cannot reach consensus when the identified node does not receive messages, directly or indirectly, from another node during the prepare row phase, the prepare column phase, the commit row phase, or the commit column phase, wherein the post phase does not include row or column based communications, wherein the identified node communicates with nodes that are not in the corresponding topological rows or topological columns of the identified node.

14. A non-transitory storage medium having stored therein instructions that are executable by one or more hardware processors to perform operations comprising:

receiving a request from a client to determine consensus in a network that includes nodes, wherein determining consensus comprises:

performing row-based communications among the nodes in the network, wherein each node only exchanges messages with nodes in the corresponding topological row; and performing column-based communications among the nodes in the network, wherein nodes in the same columns exchange messages including messages received during the row-based communications, wherein each node only exchanges messages with nodes in the corresponding topological column; and replying to a client based on the row-based communications and the column-based communications.

15. The non-transitory storage medium of claim 14, further comprising constructing the nodes into a topology of a square 2D matrix that includes r rows and c columns, wherein $r=c=\sqrt{n}$, wherein n is a number of the nodes, wherein the row-based communications and/or the column based-communications are performed asynchronously by the nodes.

16. The non-transitory storage medium of claim 15, further comprising adding virtual nodes to the topology such that the topology is the square 2D matrix, wherein the row-based communications and the column-based communications are configured to provide each of the nodes with messages from each of the other nodes in the network.

17. The non-transitory storage medium of claim 14, further comprising identifying faulty nodes in the network by identifying nodes that did not communicated during the row-based communications and/or the column-based communications, and performing a post phase for each identified node that did not receive a threshold number of messages from the other nodes to reach consensus.

18. The non-transitory storage medium of claim 17, wherein the post phase includes, for each of the identified nodes, communicating only with nodes that are not in the corresponding topological row or topological column.

19. The non-transitory storage medium of claim 18, wherein each of the nodes performs r−1 communications in the row-based communications and c−1 communications during the column-based communications, wherein each of the identified nodes performs n−(r+c−2) communications during the post phase.

20. The non-transitory storage medium of claim 19, wherein the identified nodes includes nodes that do not reach consensus.

* * * * *